US012768500B2

(12) United States Patent
Herzog et al.

(10) Patent No.: US 12,768,500 B2
(45) Date of Patent: Oct. 20, 2026

(54) DEVICE AND METHOD FOR FILLING A CONTAINER WITH COMPRESSED GASEOUS HYDROGEN

(71) Applicant: Messer SE & Co. KGaA, Bad Soden (DE)

(72) Inventors: Friedhelm Herzog, Krefeld (DE); Frank Gockel, Velbert (DE)

(73) Assignee: Messer SE & Co. KGaA, Bad Soden (DE)

( * ) Notice: Subject to any disclaimer, the term of this patent is extended or adjusted under 35 U.S.C. 154(b) by 0 days.

(21) Appl. No.: 18/841,722

(22) PCT Filed: Feb. 15, 2023

(86) PCT No.: PCT/EP2023/053709
§ 371 (c)(1),
(2) Date: Aug. 27, 2024

(87) PCT Pub. No.: WO2023/165810
PCT Pub. Date: Sep. 7, 2023

(65) Prior Publication Data
US 2025/0216031 A1 Jul. 3, 2025

(30) Foreign Application Priority Data
Mar. 3, 2022 (DE) .................... 10 2022 000 752.5

(51) Int. Cl.
*F17C 5/06* (2006.01)

(52) U.S. Cl.
CPC ........ *F17C 5/06* (2013.01); *F17C 2227/0337* (2013.01)

(58) Field of Classification Search
CPC ........................................................ F17C 5/06
(Continued)

(56) References Cited

U.S. PATENT DOCUMENTS 5,934,081 A * 8/1999 Notaro ...................... F17C 5/06 62/50.2
7,637,389 B2 * 12/2009 Kanoya .................... F17C 7/00 141/82
(Continued)

FOREIGN PATENT DOCUMENTS

EP 3076017 A1 10/2016
EP 3604893 A1 2/2020
(Continued)

OTHER PUBLICATIONS

International Search Report and Written Opinion in PCT/EP2023/053709, dated May 26, 2023, 6 pages.

*Primary Examiner* — Kenneth Rinehart
*Assistant Examiner* — Stephanie A Shrieves
(74) *Attorney, Agent, or Firm* — Andrus Intellectual Property Law, LLP

(57) ABSTRACT

A device for filling a container, in particular a vehicle tank, with compressed gaseous hydrogen includes a gas supply system for providing compressed gaseous hydrogen, a connection mechanism for producing a fluidic connection to a container to be filled, and a cooling device for cooling the hydrogen to be supplied to the container. The cooling device includes a cooling unit for cooling the hydrogen. The cooling device has a buffering medium which functions as a latent heat accumulator and which is thermally connected to the gaseous hydrogen to be supplied to the container on a first heat exchanger surface and to the cold source on a second heat exchanger surface.

11 Claims, 4 Drawing Sheets

(58) Field of Classification Search
USPC ........................................................ 141/18
See application file for complete search history.

(56) References Cited

U.S. PATENT DOCUMENTS

| | | | | |
|---|---|---|---|---|
| 10,247,358 | B2 * | 4/2019 | Allidieres | F17C 5/06 |
| 2016/0144765 | A1 * | 5/2016 | Viegas | B60H 1/005<br>62/243 |
| 2016/0290562 | A1 * | 10/2016 | Okuno | F04B 35/04 |
| 2017/0254479 | A1 * | 9/2017 | Petersen | F17C 5/00 |
| 2018/0038550 | A1 * | 2/2018 | Kondo | E02F 9/261 |
| 2018/0306381 | A1 * | 10/2018 | Fujisawa | B67D 7/58 |
| 2019/0086031 | A1 * | 3/2019 | Fujisawa | B60K 15/067 |
| 2019/0331298 | A1 * | 10/2019 | Thor | F17C 5/02 |
| 2022/0153568 | A1 * | 5/2022 | Pollica | F17C 5/007 |

FOREIGN PATENT DOCUMENTS

| | | | | |
|---|---|---|---|---|
| WO | 2013020665 | A1 | 2/2013 | |
| WO | 2015001208 | A2 | 1/2015 | |
| WO | 2018220303 | A1 | 12/2018 | |
| WO | 2019002724 | A1 | 1/2019 | |
| WO | WO-2023213371 | A1 * | 11/2023 | F17C 5/06 |

* cited by examiner

DEVICE AND METHOD FOR FILLING A CONTAINER WITH COMPRESSED GASEOUS HYDROGEN

CROSS-REFERENCE TO RELATED APPLICATIONS

The present application is the U.S. national stage application of international application PCT/EP2023/053709 filed Feb. 15, 2023, which international application was published on Sep. 7, 2023, as International Publication WO 2023/165810 A1. The international application claims priority to German Patent Application No. 10 2022 000 752.5, filed Mar. 3, 2022. The international and German applications are hereby incorporated by reference herein.

FIELD

The invention relates to an apparatus for filling a container with compressed, gaseous hydrogen, comprising a gas supply system for providing compressed gaseous hydrogen, a conduit system equipped with a connection mechanism for establishing a fluidic connection between the gas supply system and a container to be filled and comprising a cooling means for cooling the hydrogen to be supplied to the container. The invention further relates to a corresponding process.

BACKGROUND

When filling a container, for example a vehicle tank or a transport container, with compressed, gaseous hydrogen, the pressure increase in the tank and the negative Joule-Thomson coefficient in the relevant state range leads to a marked warming of the hydrogen in the container. Since this heat can be removed only insufficiently via the container walls during the filling operation, a precooling is necessary to ensure that the temperatures in the tank are within regulatory specifications, for example the specifications of the standard SAE J2601. This standard specifies that the filling of hydrogen-fueled vehicles to a final pressure of 350 bar or 700 bar under reference conditions must be completed within ten or three minutes respectively without the temperature of the vehicle tank increasing to a value of above 85° C. in the process. It is simultaneously specified that the temperature of the hydrogen during filling upon entry into the container to be filled moves within a specified temperature window which must not be exceeded or undershot. For example, for the filling category T40 which allows filling of passenger cars with hydrogen at minus 40° C., the upper and lower limits of the temperature upon entry into the container to be filled are minus 33° C. and minus 40° C. respectively. Further categories provide for filling at higher temperatures (T30, T20). The standard further specifies that this temperature window must be achieved 30 seconds after commencement of the filling process at the latest.

The required refrigeration power is normally provided here by a chiller. However, what is critical is the short-term peak power demand, in particular at commencement of filling, which may be many times higher than the average power demand. Consequently, such cooling systems must be equipped with very high-powered chillers which, however, entail significant capital costs.

WO 2015 001 208 A2 discloses a process for filling with hydrogen where the hydrogen supplied to a tank is temperature-controlled via a refrigeration reservoir. The refrigeration reservoir is a container filled with a cryogenically liquefied gas, for example liquid nitrogen, which is in thermal connection via a cooling circuit to a heat exchanger where a heat transfer medium pumped through the cooling circuit is brought into thermal contact with the hydrogen gas. However, the disadvantage here too is that the plant system must be adapted to a peak demand which exists only for a short time.

It has also already been proposed to store the hydrogen on site in a cryogenically liquefied state and to utilize the low temperature of the liquid hydrogen entirely or partially to achieve the required target temperature of the hydrogen gas provided for filling. Apparatuses of this kind are known for example from WO 2013 020 665 A1, WO 2018 220 303 A1 or WO 2019 002 724 A1. For example in the subject matter of WO 2013 020 665 A1, cryogenic liquid hydrogen is stored in a storage tank. Before commencement of filling, a portion of the liquid hydrogen is withdrawn and, using a cryopump, compressed to the respective filling pressure, wherein it is initially, however, still at a low temperature of about 50K to 60K relative to the required filling temperature. Through heating of a substream and subsequent combination with the unheated substream, a target temperature between −33° C. and −40° C. is achievable. However, the storage of the hydrogen in cryogenically liquefied form is associated with not-inconsiderable evaporation losses which are apparent especially at times of longer pauses in operation, for instance at weekends. The capital costs are also considerable.

SUMMARY

It is accordingly the object of the invention to specify a possibility for filling a container with hydrogen which features high availability and instantly available and controllable cooling power and is at the same time associated with relatively low capital costs.

This object is achieved by an apparatus and/or process having the features of the independent claims. Advantageous embodiments are specified in the dependent claims.

An apparatus according to the invention thus comprises a gas supply system by means of which gaseous hydrogen is provided at a pressure higher than a target pressure of the hydrogen in a container to be filled. The container to be filled is for example a tank of a vehicle, in particular of a road or rail vehicle, of a ship or of an aircraft, or is a mobile transport container for hydrogen (trailer) or a pressure vessel for storage of gaseous hydrogen, for example a gas cylinder or a compressed gas cylinder bundle. The gas supply system is for example one or more pressure containers, for instance a storage tank or a cylinder bundle, or is a high-pressure conduit. The gas supply system may also comprise a conditioning container which at commencement of a filling operation contains hydrogen which has been withdrawn from a low pressure tank or a pipeline and compressed using a compressor and/or has been withdrawn from a liquid supply and evaporated using an evaporator. The apparatus further comprises a conduit system equipped with a connection mechanism for establishing a fluidic connection between the gas supply system and a container to be filled. The connection mechanism is adapted to the respective container type or the type of connection. It is for example a coupling by which the container to be filled is securely, but detachably connected to the conduit system, and a fluidic connection is thus established; in the case of a hydrogen filling station, the container to be filled is a vehicle tank and the connection mechanism comprises for example a fuel dispenser equipped with a filling hose including filling nozzle for connection to a filling port of the vehicle tank.

The apparatus according to the invention further comprises a cooling means for cooling the hydrogen to be supplied to the container. The cooling means is equipped with a buffer medium which acts as a latent heat storage medium and is in thermal connection at a first heat exchanger surface with at least one substream of the hydrogen to be supplied to the container during a filling operation and at a second heat exchanger surface with a refrigeration source. At the second heat exchanger surface, the buffer medium is cooled to a temperature below a required temperature of the hydrogen to be supplied to the container (hereinafter “target temperature”) while, at the first heat exchanger surface, the hydrogen is cooled through the thermal contact with the cooled buffer medium to a filling temperature which preferably corresponds to the target temperature.

The buffer medium acting as a latent heat storage medium makes it possible here to cool the hydrogen to be supplied to the container which is provided in the gas supply system for example at ambient temperature to a substantially constant temperature during a complete filling operation without in the process needing simultaneously to cool the buffer medium in turn to the same extent or at all. The cooling of the hydrogen is thus decoupled from the cooling of the buffer medium. The energy that can be stored in the latent heat storage medium in the form of transformation enthalpy is determined by the amount and type of the buffer medium; in particular, it is possible in the case of a suitable configuration to calculate the heat storage capacity of the buffer medium such that the hydrogen to be dispensed during a filling operation or during a plurality of filling operations is cooled to a substantially constant temperature, corresponding to the target temperature, of for example minus 40° C. By contrast, the cooling of the buffer medium via the second heat exchanger may be carried out continuously over a longer duration which may also comprise intermediate pauses instead of or in addition to the durations of a filling operation or a plurality of filling operations.

It is thus possible to perform the cooling of the buffer medium with a relatively low refrigeration power, for example with a relatively low-power chiller.

The buffer medium is preferably a medium which in operation of the apparatus, i.e. during the thermal contact with the hydrogen during the filling operation, at least partially undergoes a solid-liquid phase transition. Before the filling operation, the buffer medium is thus at least partially in the solid state and starts to undergo successive melting upon passage of the hydrogen in the first heat exchanger. The phase transition temperature or the phase transition temperature range (melting point) of the buffer medium is thus below the temperature of the hydrogen supplied to the first heat exchanger but higher than the lowest temperature to which the buffer medium can be cooled through the thermal contact with the refrigeration source at the second heat exchanger. During the phase transition, the melting enthalpy prevents a substantial temperature increase of the buffer medium even in the case of continued supply of heat. This makes it possible to cool the hydrogen to a substantially always constant temperature during the entire filling operation or even during a plurality of successive filling operations and at the same time to reliably prevent the undershooting of a certain minimum temperature for the hydrogen.

In a first advantageous embodiment of the invention, the buffer medium employed is a pure substance whose melting temperature is below a target temperature required for the respective filling task, i.e. for example below a temperature range between minus 40° C. and minus 60° C. A contemplated pure substance of this type is octane for example.

Another preferred buffer medium is composed of a substance mixture, in particular a substance mixture of mutually miscible liquids, the composition of which may simultaneously also be used to adjust its solid-liquid phase transition temperature. The composition of the substance mixture may thus be selected according to a target temperature required for the respective filling task; for example, a composition is selected, whose phase transition temperature is in the range of the target temperature. Preferred substance mixtures employed include mixtures of water and ethylene glycol or of water and propylene glycol where, through variation of the quantity ratio between the two substances, the solid-liquid phase transition temperature may be selected in a wide range.

A likewise advantageous buffer medium is carbon dioxide which in the cooling means is at the temperature of its triple point (−57° C.) or therebelow. By way of example, the cooling means in this case comprises a container which is filled with carbon dioxide as buffer medium and whose head space contains gaseous $CO_2$ at a largely constant pressure of 5.2 bar(a). If continued cooling leads to complete freezing, the pressure suddenly decreases; the state of matter of the carbon dioxide can be easily captured through the measurement of the $CO_2$ pressure and thus allows the control of the supply of refrigeration to the buffer medium according to the measured pressure via a control means. If a lower temperature than its melting temperature is moreover allowed in the $CO_2$ serving as buffer medium, then $CO_2$ desublimates from the gas phase and becomes solid. Since the specific sublimation enthalpy of the $CO_2$ is approximately double the heat of melting, appropriate dimensioning of the gas space in this case makes it possible to further markedly increase the heat absorption capacity of the carbon dioxide employed as buffer medium.

The cooling means comprises for example a container (buffer container) which is filled with the buffer medium and in which the first and the second heat exchanger surface are arranged, for example in the form of pipe coils. The hydrogen to be dispensed during a filling operation flows through the first heat exchanger surface. The second heat exchanger surface is, together with the refrigeration source, part of a cooling system for cooling the buffer medium. The refrigeration source employed here is preferably a chiller. The second heat exchanger surface here is either part of the chiller itself and forms for example an evaporator arranged in a cooling circuit of the chiller or the second heat exchanger surface is thermally connected with a chiller via a separate cooling circuit. It is moreover also possible to provide a plurality of buffer containers which are filled with the buffer medium and are each equipped with first and second heat exchanger surfaces.

Alternatively or in addition, the cooling system comprises a cooling conduit connected to a tank for a cryogenic cooling medium. The refrigeration source is in this case the cryogenic medium which is stored in the tank and is supplied to the second heat exchanger via the cooling conduit and thus cools the buffer medium. The cryogenic cooling medium employed here is for example liquid or cold gaseous nitrogen or another cryogenically liquefied gas. It is moreover advantageously possible here to employ residual refrigeration of the cryogenic cooling medium still present after the thermal contact at the second heat exchanger for cooling other regions of the apparatus according to the invention.

For example, the cooling conduit may have arranged in it, downstream of the second heat exchanger surface, a double pipe and/or a further heat exchanger and/or a refrigeration storage means at which the cryogenic cooling medium may be brought into thermal contact, upstream of the first heat exchanger surface, with the hydrogen transported through the conduit system between the pressure storage system and the container to be filled.

If the storage of latent heat in the cooling means is effected through utilization of a phase transition in the buffer medium, the cooling means should be configured such that the buffer medium may be brought to a temperature below the corresponding phase transition temperature through the thermal contact with the refrigeration source at the second heat exchanger.

The cooling means is advantageously equipped with means for generating a flow in the buffer medium to improve the heat transfer in the partially liquefied buffer medium. These are for example means which generate a convective flow within a buffer container filled with the buffer medium, for example a stirring means or a recirculation conduit, by means of which in operation of the apparatus liquid buffer medium is continuously withdrawn from a first region of the buffer container filled with the buffer medium and introduced into another region of the buffer container using a pump.

An advantageous configuration of the invention provides that the cooling means is equipped with at least two separately present buffer media which each have different solid-liquid phase transition temperatures and may be brought into thermal contact with the hydrogen to be supplied to the container independently of one another. The conduit system transporting the hydrogen from the gas supply system to the container thus branches into two or more subconduits which each pass through a first heat exchanger in a buffer container filled with a buffer medium. The buffer containers are each equipped with a second heat exchanger by means of which the buffer media in the buffer containers may be simultaneously or separately from one another cooled through thermal contact with the refrigeration source. The buffer media present in the buffer containers are in the form of latent heat storage media but each have different solid-liquid phase transition temperatures. These are for example substance mixtures whose compositions are each different, for instance ethylene glycol-water mixtures having different mixing ratios. The subconduits may be separately controlled using a control means, with different buffer media being employed to cool the hydrogen depending on the required target temperature. In this way, uniform cooling of the hydrogen to the respective target temperature is ensured and a required minimum temperature for the hydrogen is not undershot even in the case of different filling tasks.

In a once again advantageous embodiment of the invention, the conduit system branches into two subconduits between the gas supply system and the container to be filled, a first subconduit proceeding therefrom to the first heat exchanger surface for conveying a first substream of hydrogen and a second subconduit proceeding therefrom as a bypass conduit to bypass the cooling means for conveying a second substream of hydrogen, the two subconduits combining again downstream of the cooling means. A control means makes it possible here to control the quantity ratio between the first and the second substream according to a temperature of the hydrogen supplied to the container. In this way, the temperature of the hydrogen may be easily adapted to different target temperatures required by the respective container, even if different buffer media, each having different phase transition temperatures, as described above, are unavailable.

A process for filling a container with compressed, gaseous hydrogen provides that gaseous hydrogen is provided under pressure in a gas supply system and supplied to a container for the purpose of filling via a conduit system and, before supplying to the container, cooled in a cooling means. According to the invention, before commencement of a filling operation, a buffer medium present in the cooling means and acting as a latent heat storage medium is to this end cooled by continuous thermal contact with a refrigeration source and in the process brought to a temperature below its solid-liquid phase transition temperature. During the filling operation, the buffer medium is subsequently brought into thermal contact with at least one substream of the hydrogen to be supplied to the container, thus cooling the hydrogen and at least partially melting the buffer medium present in the solid state. The container to be filled (filled up) is for example a tank of a vehicle, in particular a road or rail vehicle, of a ship or of an aircraft, is a mobile transport container for hydrogen (trailer) or is a pressure vessel for storing gaseous hydrogen, for example a gas cylinder or a compressed gas cylinder bundle.

According to the invention, the conversion enthalpy of the buffer medium is thus utilized for cooling hydrogen to a substantially constant temperature during a filling operation or during a plurality of consecutive filling operations without simultaneously requiring the same extent of cooling of the buffer medium. The cooling of the buffer medium is preferably effected continuously. The cooling of the buffer medium is effected for example over a period which may be a multiple, for example five times to ten times the average duration, of a filling operation, thus making it possible to employ a correspondingly low-power cooling system associated with relatively low capital costs. The filling temperature, to which the hydrogen is cooled in the cooling means, is for example at a value between minus 40° C. and minus 60° C. Higher filling temperatures are made possible for example through a lower heat transfer power of the cooling means, the selection of another buffer medium or by admixing of correspondingly warmer hydrogen gas.

The invention enables a filling system having low installation and maintenance costs. The buffer medium acting as a latent heat storage medium allows firstly uniform cooling of the hydrogen during a filling operation and secondly effectively prevents undershooting of a specified minimum temperature. The apparatus according to the invention and the process according to the invention are particularly suitable for filling motor vehicles, commercial vehicles, for example forklifts, at a logistics site, for bus fleets or regional railway networks operated with hydrogen-powered vehicles, though the possible applications are not limited thereto.

BRIEF DESCRIPTION OF THE DRAWINGS

An exemplary embodiment of the invention shall be more particularly elucidated with reference to the drawings.

DETAILED DESCRIPTION

Figure 1:
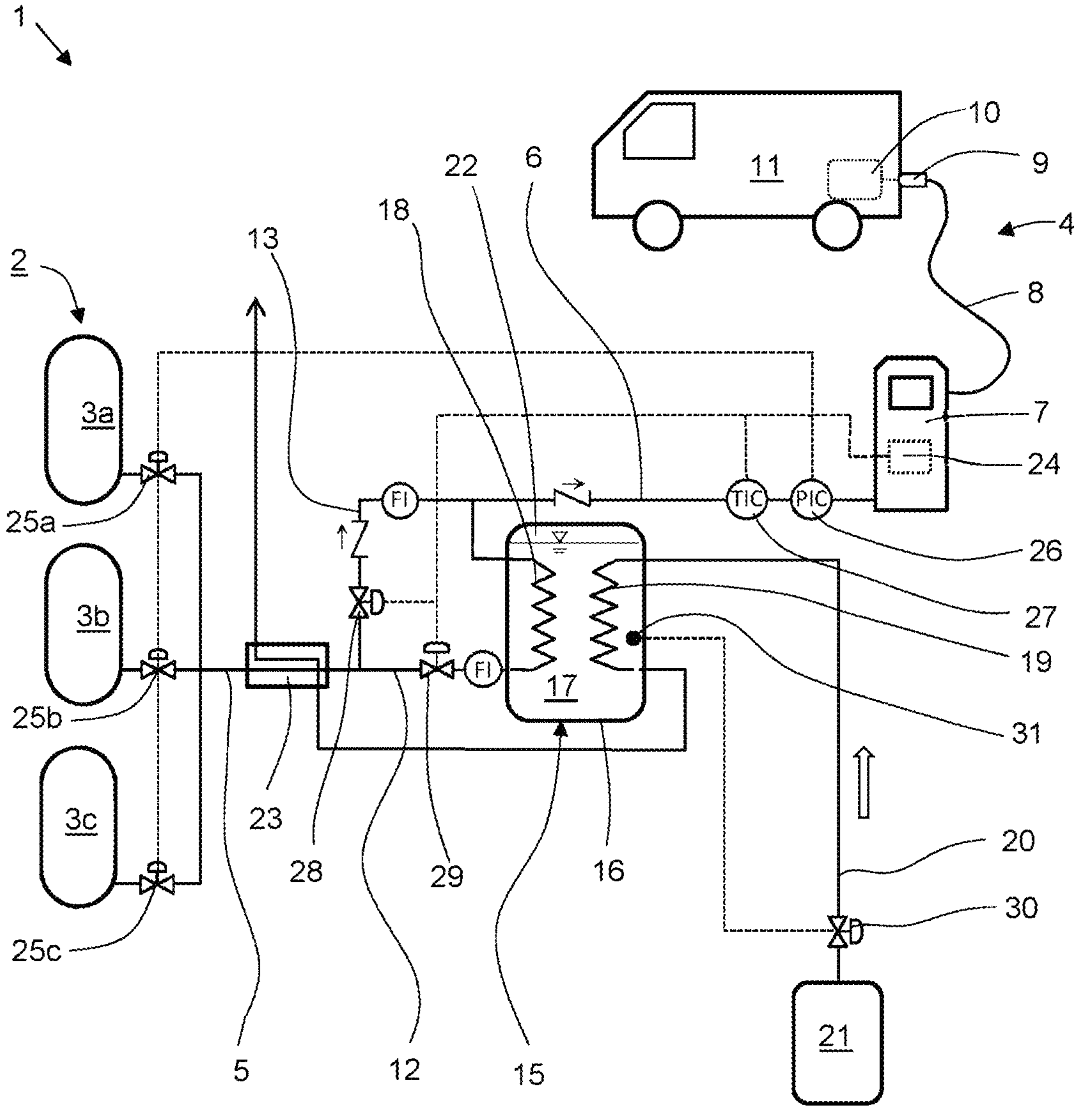
FIG. 1 shows an apparatus according to the invention in a first embodiment.

The apparatus 1 according to the invention shown in FIG. 1 is used for filling a container, for example a vehicle tank, with hydrogen. The apparatus 1 comprises a gas supply system 2 for storing gaseous hydrogen. In the exemplary embodiment shown here, the gas supply system 2 comprises a plurality of pressure containers 3*a*, 3*b*, 3*c* in which hydrogen is stored at different pressures. For example, the pressure container 3*a* is a high-pressure container in which hydrogen is stored at 700 bar or more, the pressure container 3*b* is an intermediate pressure container in which hydrogen is stored at a pressure between 450 bar and 500 bar, and the pressure container 3*c* is a low-pressure container for storage of hydrogen at a pressure between 20 bar and 200 bar. The gas supply system 2 may also comprise more or fewer pressure containers than shown here. The term "pressure container" is to be understood very generally here and comprises any type of storage means from which gaseous hydrogen may be withdrawn at the corresponding pressure, for example pressure tanks or compressed gas cylinder bundles.

The invention is also not limited to a gas supply system comprising pressure containers 3*a*, 3*b*, 3*c*; on the contrary, other options for supplying with hydrogen gas may also be employed, for example the front conduit section 5 may be in fluidic connection with a high-pressure hydrogen conduit (pipeline) or, via an evaporation unit, with a source for liquid hydrogen or, via a compressor, with a low-pressure container or a low-pressure conduit in a manner not shown here.

The apparatus 1 further comprises a conduit system connected to the gas supply system 2 and having a front conduit section 5, and a back conduit section 6 equipped with a connection mechanism 4 for producing a fluidic connection with a container to be filled, in the exemplary embodiment shown here a vehicle tank 10. The connection mechanism is adapted to the container to be filled in each case; in the exemplary embodiment shown here, the connection mechanism 4 consists of a fuel dispenser 7 having a filling hose 8 which, in a manner known per se, has a filling nozzle 9 for connection to a corresponding connection on the vehicle tank 10 of a vehicle 11. In the exemplary embodiment shown here, the vehicle 11 is a motor vehicle; however, it may also be for example a rail vehicle, an aircraft or a ship. Contemplated motor vehicles to be filled include in particular passenger cars, trucks or buses. It is expressly noted that the connection mechanism shown here and consisting of the fuel dispenser 7, filling hose 8 and filling nozzle 9 is only one option for establishing a fluidic connection of a gas supply system 2 to a container to be filled which is especially suitable in the case of hydrogen filling stations for vehicles. If other types of containers are filled with gaseous hydrogen using the apparatus 1, another type of a connection mechanism may be used, for example a coupling suitable for conducting gases.

In the exemplary embodiment according to FIG. 1, the front conduit section 5 exiting the gas supply system 2 branches into two subconduits 12, 13 which combine again at the back conduit section 6. A cooling means 15 for cooling the hydrogen passed through the subconduit 12 is arranged in the subconduit 12 and the design and mode of operation thereof is more particularly described hereinbelow.

Figure 3:
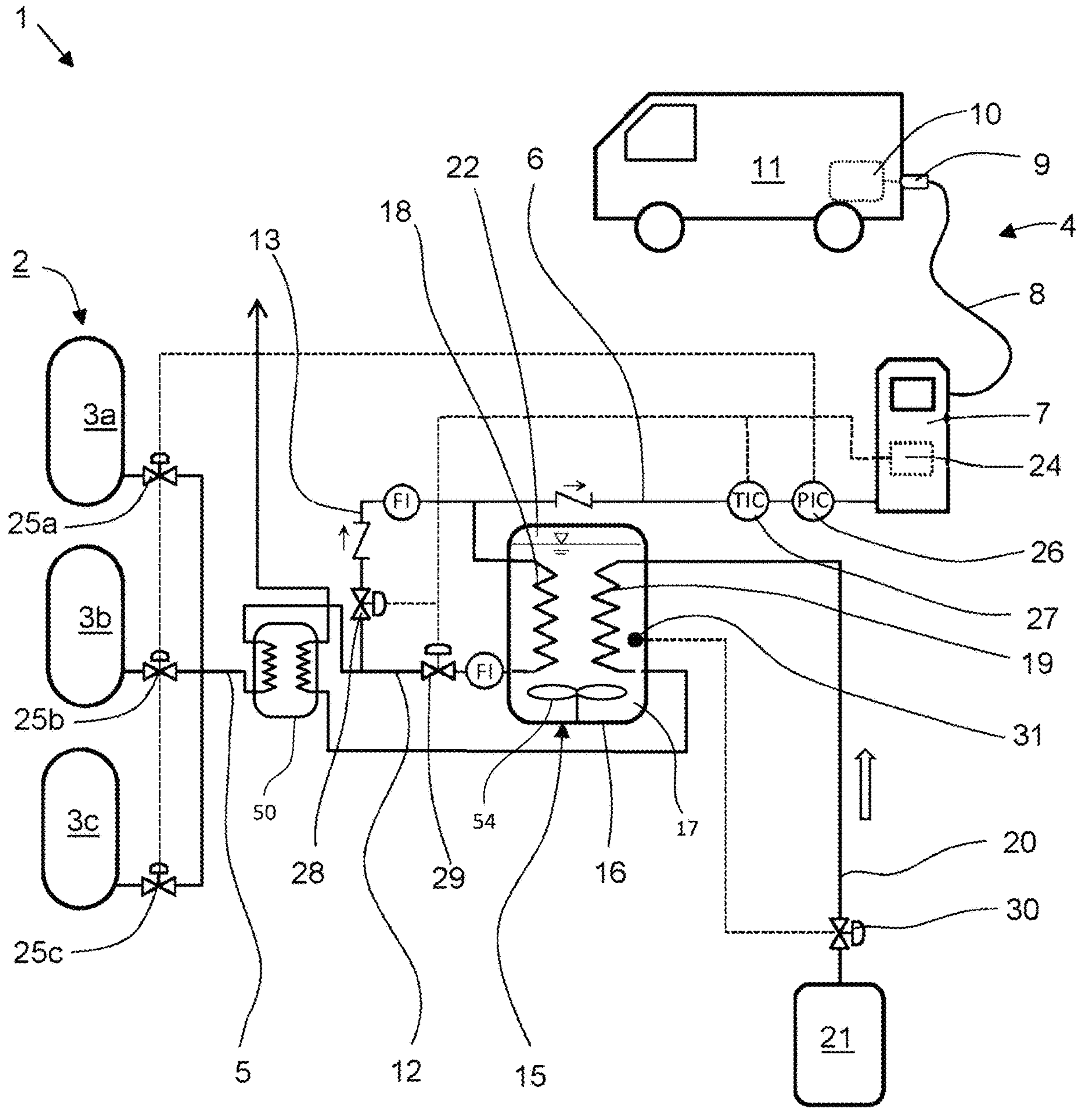
FIG. 3 shows an embodiment of the apparatus of FIG. 1 with an additional heat exchanger in place of the double pipe and a means for generating a flow in the buffer medium.
Figure 4:
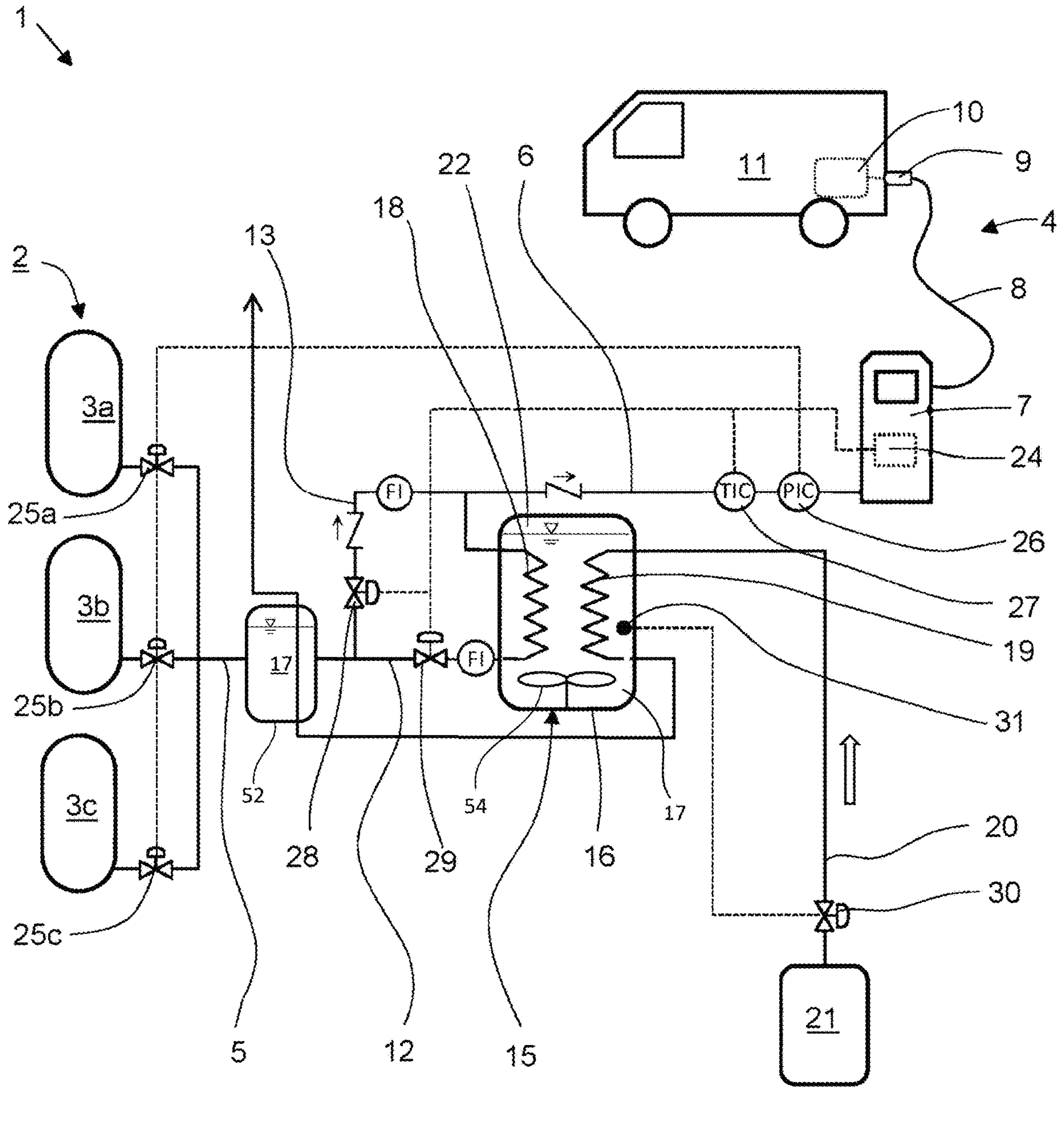
FIG. 4 shows an embodiment of the apparatus of FIG. 1 with a refrigeration storage means at which the cryogenic cooling medium is brought into thermal contact with the hydrogen in the conduit system in place of the double pipe and a means for generating a flow in the buffer medium.

The cooling means 15 comprises a buffer container 16 which in operation of the apparatus 1 is filled with a buffer medium 17 acting as a latent heat storage medium. Arranged within the buffer container 16 are two heat exchanger surfaces 18, 19 which are each in the form of pipe coils. While the first heat exchanger surface 18 is integrated in the subconduit 12, the second heat exchanger surface 19 is in fluidic connection with a container 20 for a cryogenic cooling medium, for example liquid nitrogen, via a cooling conduit 21. To utilize the residual refrigeration of the cooling medium still present after passage through the cooling means 15, the cooling conduit 21 is in thermal connection with the front conduit section 5 at a double pipe 23. Moreover, instead of the double pipe 23, it is also possible to provide a heat exchanger 50, as illustrated in FIG. 3, or a refrigeration accumulator 52, as illustrated in FIG. 4.

The buffer medium 17 employed is a medium which in operation of the apparatus 1 undergoes a solid-liquid phase transition, whereby the melting enthalpy thereof is utilized for the cooling process. The buffer medium 17 is selected such that its phase transition temperature (melting point) is firstly below the temperature of the hydrogen entering at the heat exchanger surface 18, i.e. for example ambient temperature (20° C.), and is secondly above the temperature to which the buffer medium 17 can be cooled by the thermal contact with the second heat exchanger surface 19, i.e. for example minus 60° C. The phase transition temperature is preferably equal to or less than a target temperature for the hydrogen to be supplied to the vehicle tank 11, i.e. for example between minus 40° C. and minus 50° C. The buffer medium is for example octane, carbon dioxide or a substance mixture, for example a water-glycol mixture whose melting point may be specified by selection of a suitable mixing ratio of the two components.

In operation of the apparatus 1, the buffer medium 17 present in the buffer container 16 is cooled before commencement of a filling operating by thermal contact with the cooling medium passed through the cooling conduit 20 to such an extent that it completely or partially solidifies in the buffer container 16. The cooling operation may also be continued during the filling operation and between successive filling operations or during pauses in operation. If the volume of the buffer medium 17 increases here, a gas phase 22 present in the buffer container 16 serves as an equalization volume.

To fill the vehicle tank 10, the filling nozzle 9 is connected to a filling port of the vehicle tank 10. The data of the filling (total amount and pressure of the hydrogen to be filled) are entered at the fuel dispenser 7. Sensors (not shown here) may furthermore be used to automatically capture further information required and/or advantageous for the filling operation, for example the type, the current fill level, the volume and/or the maximum filling pressure of the vehicle tank 10 and/or the existence of a secure and gastight connection between the filling nozzle 9 and the vehicle tank 10.

The information thus obtained is transmitted to a control unit 24. According to the input and/or captured information, a control command to dispense hydrogen from the pressure containers 3*a*, 3*b*, 3*c* is issued from the control unit 24 according to a predetermined program. For this purpose, the control unit is in data connection with valves 25*a*, 25*b*, 25*c* at the outlets of the pressure containers 3*a*, 3*b*, 3*c* and with a pressure sensor 26 in the back conduit section 6. During the filling, the control unit 24 continuously determines a best possible pressure value for supply from the gas supply system 2 and automatically ensures that the corresponding valve 25*a*, 25*b*, 25*c* is opened or closed. This makes it possible to control especially the sequence of supply of compressed gas from the pressure containers 3*a*, 3*b*, 3*c* into the vehicle tank 10 at a minimum cost in time and energy.

For filling, the hydrogen present in the pressure containers 3*a*, 3*b*, 3*c* approximately at ambient temperature must be cooled to a predetermined target temperature of for example between minus 20° C. and minus 40° C. This is effected in that at least a substream of the hydrogen withdrawn from the corresponding pressure container 3*a*, 3*b*, 3*c* is passed through the subconduit 12, brought into indirect thermal contact with the buffer medium 17 at the first heat exchanger surface 18 and subsequently supplied to the vehicle tank 10 in a cooled state. Upon thermal contact with the hydrogen at the first heat exchanger surface 18, heat is supplied to the buffer medium 17 and undergoes successive melting. Provided the buffer container 16 contains a solid and a liquid phase of the buffer medium 17, the temperature of the buffer medium 17 hardly changes and the refrigeration power transferred to the hydrogen is substantially constant. At the same time, the temperature of the buffer medium 17 does not fall below its melting temperature and so it is possible to omit the installation of an under temperature safety shutoff which would otherwise ensure that the hydrogen is not cooled below a minimum allowable temperature. Corresponding configuration of the buffer container 16 thus ensures that the temperature conditions in the buffer container 16 remain substantially constant over the duration of a filling operation or a plurality of successive filling operations.

The heat supplied discontinuously via the first heat exchanger surface 18 during the filling operation or during the filling operations is continuously withdrawn from the buffer medium 17 at the second heat exchanger surface 19 through thermal contact with the cryogenic cooling medium passed through the cooling conduit 20. It is especially also possible here to utilize times between successive filling operations or during pauses in operation, for example at night, for cooling the buffer medium 17. The cooling power of the second heat exchanger surface 19 is selected here such that the buffer medium 17 is present in the buffer container 16 at least partially in the solid state before commencement of a filling operation or the first of a series of successive filling operations. If required, the flow rate of the cooling medium passed through the cooling conduit 20 may be adjusted according to a temperature in the buffer container via a valve 30. The reference value employed here is a possible deviation of a temperature measured on a temperature sensor 31 in the buffer container 16 from the phase transition temperature of the buffer medium 17.

The cooling using the cooling means 15 allows the filling of the vehicle tank 10 with hydrogen whose temperature does not exceed the target temperature of the hydrogen in the vehicle tank 10 during the entire filling operation. In the exemplary embodiment according to FIG. 1, the temperature of the hydrogen to be supplied to the vehicle tank 11 may be adapted to different target temperatures if required. To this end, the temperature of the hydrogen in the back conduit section 6 is determined using a temperature sensor 27 and compared with the target temperature. According to the temperature difference thus determined, the ratio of the hydrogen substreams passed through the subconduits 12, 13 may be adjusted by actuating of valves 28, 29 in the subconduits 12, 13 and thus the hydrogen supplied to the vehicle tank 10 may be temperature-controlled. It will be appreciated that such a procedure is not absolutely necessary in the context of the invention. Thus, for example if a constant target temperature is always demanded for all filling operations, the subconduit 13 and the corresponding control means may be omitted.

Figure 2:
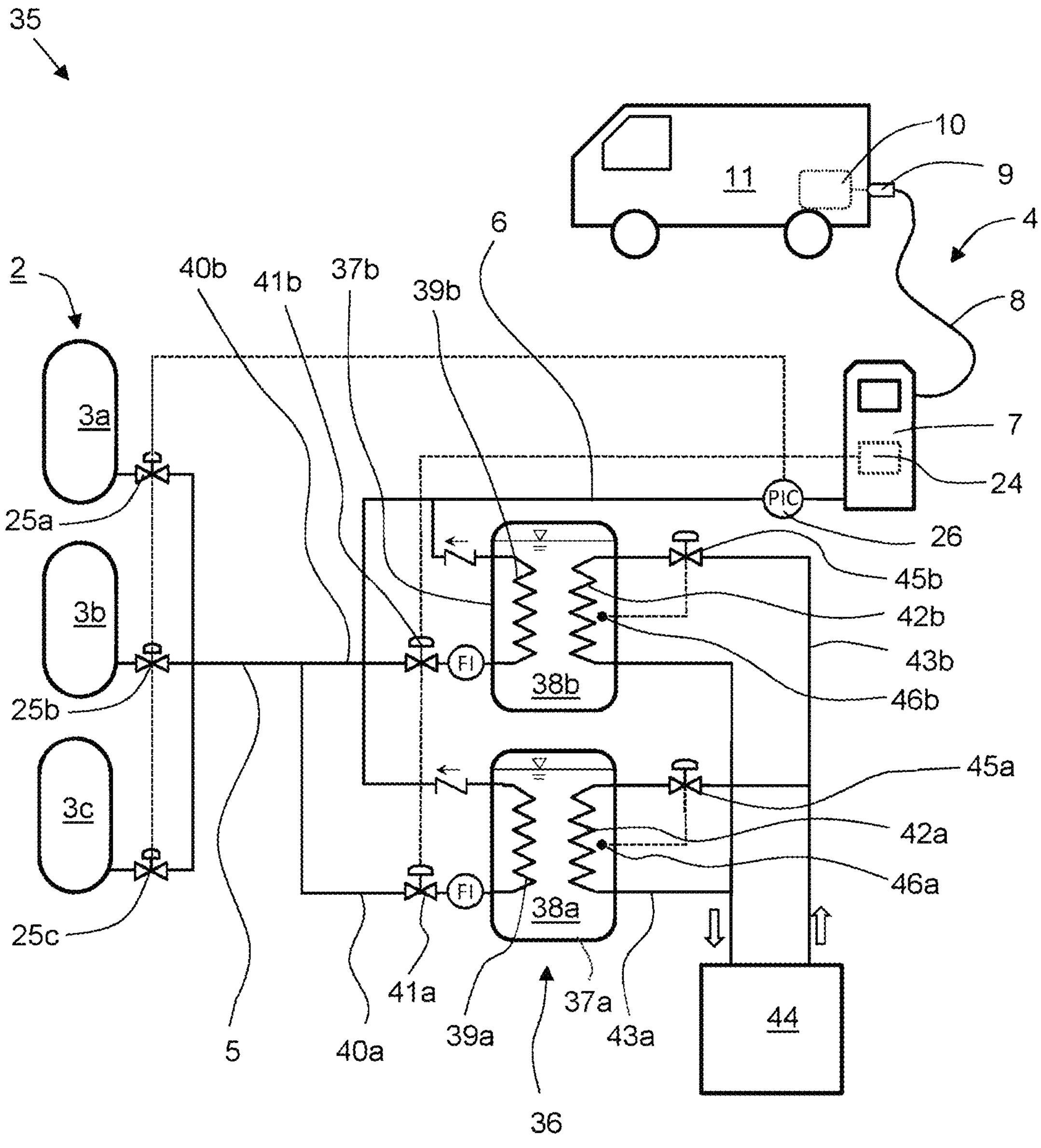
FIG. 2 shows an apparatus according to the invention in a second embodiment.

The apparatus 35 shown in FIG. 2 differs from the apparatus 1 shown in FIG. 1 essentially by a different cooling means. Otherwise identical features are thus given the same reference numerals in FIG. 2 as in the exemplary embodiment shown in FIG. 1.

The cooling means 36 of the apparatus 35 comprises two buffer containers 37*a*, 37*b* filled with different buffer media 38*a*, 38*b* which each act as latent heat storage media. The buffer media 38*a*, 38*b* have different solid-liquid phase transition temperatures; for example, they are water-glycol mixtures having different compositions. For example, the phase transition temperature of the buffer medium 38*a* is minus 40° C. and the phase transition temperature of the buffer medium 38*b* is minus 20° C. The buffer containers 37*a*, 37*b* each have first heat exchanger surfaces 39*a*, 39*b* arranged in them that are in fluidic connection with the front conduit section 5 and the back conduit section 6 of the conduit system via subconduits 40*a*, 40*b*. The subconduits 40*a*, 40*b* have valves 41*a*, 41*b* arranged in them that are in data connection with the control means 24.

The buffer containers 37*a*, 37*b* further each have second heat exchanger surfaces 42*a*, 42*b* arranged in them that are each in fluidic connection via a cooling circuit 43*a*, 43*b* with a refrigeration source, in the exemplary embodiment shown here with a chiller 44. The cooling circuits 43*a*, 43*b* are equipped with valves 45*a*, 45*b* by means of which they may each be opened and closed independently of one another. The valves 45*a*, 45*b* are each in data connection with a temperature sensor 46*a*, 46*b* via a control means (not shown here), which sensor, as shown here, is arranged in the buffer container 37*a*, 37*b* or at another suitable place. This ensures that the supply of the refrigerant to the second heat exchanger surfaces 42*a*, 42*b* is amplified or throttled in the case of a deviation of the temperature from the respective phase transition temperature. Contemplated heat transfer medium in the cooling circuits 43*a*, 43*b* includes a substance whose melting temperature is below the melting temperature of the buffer medium 17, for example brine or an ethylene glycol-water mixture of suitable composition.

In addition, (not shown here) the second heat exchanger surfaces 42*a*, 42*b* may also function as an evaporator of a chiller, in which case additional cooling circuits 43*a*, 43*b* connecting the heat exchanger surfaces 42*a*, 42*b* with the chiller 44 are no longer necessary. The exemplary embodiment according to FIG. 2 may also effect cooling of the buffer media 38*a*, 38*b* with a cryogenic medium according to the embodiment in FIG. 1, or vice versa; the exemplary embodiment according to FIG. 1 may employ a cooling circuit connected to a chiller for cooling the buffer medium 17.

In operation of the apparatus 35, initially the buffer media 38*a*, 38*b* are cooled using the cooling circuits 40*a*, 40*b* to such an extent that both buffer media 38*a*, 38*b* are at least partially in the solid state. Before commencement of a filling operation, a value for a target temperature for the hydrogen to be filled into the vehicle tank 10 is then input into the control unit 24. The control unit 24 determines the buffer medium 38*a*, 38*b* suitable for this target temperature, in the following for example buffer medium 38*a*, and then indicates a control command for opening the valve 41*a* and for closing the valve 41*b*. This is followed by cooling of the hydrogen from the gas supply system 2 using the buffer medium 38*a* according to the manner described above in the exemplary embodiment according to FIG. 1. By way of the ability of the buffer medium 38*a* to store absorbed heat in the form of melting enthalpy, the hydrogen is cooled to a constant temperature during the entire filling operation. In addition, excessive cooling of the hydrogen is effectively prevented. The cooling of the buffer media 38*a*, 38*b* via the cooling circuits 43*a*, 43*b* may be continued or interrupted independently of the cooling of the hydrogen.

In addition, (not shown here) the embodiment according to FIG. 2 may also provide for a subconduit similar to the subconduit 13 in FIG. 1 as well as a corresponding temperature control means which makes it possible to admix warm hydrogen gas with the hydrogen cooled in the cooling means 36 in the back conduit section 6 if required.

The buffer containers 16, 37 *a*, 37 *b* may each furthermore comprise means for generating a convective flow in the respective buffer container 16, 37 *a*, 37 *b* in order to ensure a good heat transfer. For example, FIGS. 3 and 4 illustrate an embodiment of a buffer container 16 that includes a stirring means 54 configured as a means for generating a convective flow in the buffer container 16. Additionally or alternatively, the buffer medium 17, 38 *a*, 38 *b* may be continuously withdrawn from the lower region of the buffer container 16, 37 *a*, 37 *b* and recycled in an upper region of the buffer container 16, 37 *a*, 37 *b* using a pump.

In the exemplary embodiments shown here, the container to be filled is the vehicle tank 10 of a vehicle 11. However, the invention is not limited thereto and the container to be filled may be in principle any type of container in which hydrogen gas is transported and/or stored under pressure. Thus, the container to be filled may also be a trailer, a compressed gas cylinder or a compressed gas cylinder bundle; in this case, especially the connection mechanism between the conduit system and the container is a different one to the connection mechanism 4 described here and composed of a fuel dispenser 7 including a filling hose 8 and a filling nozzle 9. A contemplated coupling in such cases includes for example a coupling suitable for hydrogen of the corresponding temperature which allows a flow-tight, but detachable connection between the conduit system and the container to be filled.

LIST OF REFERENCE NUMERALS

1 Apparatus
2 Gas supply system
3*a*, 3*b*, 3*c* Pressure container
4 Connection mechanism
5 Front conduit section
6 Rear conduit section
7 Fuel dispenser
8 Filling hose
9 Filling nozzle
10 Vehicle tank
11 Vehicle
12 Subconduit
13 Subconduit
14 -
15 Cooling means
16 Container
17 Buffer medium
18 First heat exchanger surface
19 Second heat exchanger surface
20 Cooling conduit
21 Container
22 Gas phase
23 Double pipe
24 Control unit
25*a*, 25*b*, 25*c* Valve
26 Pressure sensor
27 Temperature sensor
28 Valve
29 Valve
30 Valve
31 Temperature sensor
32 -
33 -
34 -
35 Apparatus
36 Cooling means
37*a*, 37*b* Container
38*a*, 38*b* Buffer medium
39*a*, 39*b* First heat exchanger surface
40*a*, 40*b* Subconduit
41*a*, 41*b* Valve
42*a*, 42*b* Second heat exchanger surface
43*a*, 43*b* Cooling circuit
44 Chiller
45*a*, 45*b* Valve
46*a*, 46*b* Temperature sensor

The invention claimed is:

1. An apparatus for filling a container with compressed, gaseous hydrogen, the apparatus comprising:

a gas supply system for providing compressed gaseous hydrogen;

a conduit system equipped with a connection mechanism for establishing a fluidic connection between the gas supply system and a container to be filled; and a cooling means for cooling the hydrogen to be supplied to the container;

wherein the cooling means is equipped with a buffer medium which acts as a latent heat storage medium and is in thermal connection at a first heat exchanger surface with the gaseous hydrogen to be supplied to the container and at a second heat exchanger surface with a refrigeration source;

wherein the buffer medium is selected such that the buffer medium at least partially undergoes a solid-liquid phase transition in operation of the apparatus; and wherein the buffer medium employed is a substance mixture whose solid-liquid phase transition temperature is variable according to its composition.

2. The apparatus as claimed in claim 1, wherein the buffer medium employed is carbon dioxide, which is controllable at a temperature equal to or below the temperature of its triple point in the cooling means.

3. The apparatus as claimed in claim 1, wherein the refrigeration source comprises a chiller in which the second heat exchanger surface is integrated or which is in thermal connection with the second heat exchanger surface via a cooling circuit.

4. The apparatus as claimed in claim 1, wherein the refrigeration source comprises a tank which is filled with a cryogenic cooling medium and is in thermal connection with the second heat exchanger surface via a cooling conduit.

5. The apparatus as claimed in claim 4, wherein the cooling conduit has arranged in the cooling conduit, downstream of the second heat exchanger surface, a double pipe and/or a further heat exchanger and/or a refrigeration storage means at which the cryogenic cooling medium is brought into thermal contact, upstream of the first heat exchanger surface, with the hydrogen in the conduit system.

6. The apparatus as claimed in claim 1, wherein the cooling means is equipped with means for generating a flow in the buffer medium.

7. The apparatus as claimed in claim 1, wherein the cooling means is equipped with at least two separately present buffer media which each have different solid-liquid phase transition temperatures and are brought into thermal contact with the hydrogen to be supplied to the container independently of one another at separate heat exchanger surfaces.

8. The apparatus as claimed in claim 1, wherein the conduit system branches into two subconduits, a first subconduit proceeding therefrom to the first heat exchanger surface for conveying a first substream of hydrogen and a second subconduit proceeding therefrom as a bypass conduit to bypass the cooling means for conveying a second substream of hydrogen, wherein a control means is provided for controlling a quantity ratio between the first substream and the second substream according to a temperature of the hydrogen supplied to the container.

9. The apparatus as claimed in claim 1, wherein the container is a vehicle tank and the connection mechanism comprises a fuel dispenser equipped with a filling hose including a filling nozzle connected to the conduit system.

10. A process for filling a container with compressed, gaseous hydrogen, the process comprising:

providing gaseous hydrogen under pressure in a gas supply system;

supplying the gaseous hydrogen to a container for the purpose of filling via a conduit system; and cooling the gaseous hydrogen in a cooling means before the gaseous hydrogen is supplied to the container;

wherein, before commencement of a filling operation, a buffer medium present in the cooling means and acting as a latent heat storage medium is cooled by thermal contact with a refrigeration source and in the process brought to a temperature below its solid-liquid phase transition temperature, then the buffer medium is brought into thermal contact with at least one substream of the hydrogen to be supplied to the container during the filling operation and cools the at least one substream of the hydrogen;

wherein the buffer medium is selected such that the buffer medium at least partially undergoes a solid-liquid phase transition during the filling operation; and wherein the buffer medium employed is a substance mixture whose solid-to-liquid phase transition temperature is variable according to its composition.

11. An apparatus for filling a container with compressed, gaseous hydrogen, the apparatus comprising:

a gas supply system for providing compressed gaseous hydrogen;

a conduit system equipped with a connection mechanism for establishing a fluidic connection between the gas supply system and a container to be filled; and a cooling means for cooling the hydrogen to be supplied to the container;

wherein the cooling means is equipped with a buffer medium which acts as a latent heat storage medium and is in thermal connection at a first heat exchanger surface with the gaseous hydrogen to be supplied to the container and at a second heat exchanger surface with a refrigeration source; and wherein the cooling means is equipped with at least two separately present buffer media which each have different solid-liquid phase transition temperatures and are brought into thermal contact with the hydrogen to be supplied to the container independently of one another at separate heat exchanger surfaces.

* * * * *